(12) United States Patent
Veillette et al.

(10) Patent No.: US 12,292,350 B2
(45) Date of Patent: May 6, 2025

(54) MAGNETOELASTIC TORQUE SENSOR ASSEMBLY FOR REDUCING MAGNETIC ERROR DUE TO HARMONICS

(71) Applicant: BRP Megatech Industries Inc., Valcourt (CA)

(72) Inventors: Jean-Francois Veillette, St. Boniface (CA); Serge Kaldany, Munich (DE)

(73) Assignee: BRP Megatech Industries Inc., Valcourt (CA)

( * ) Notice: Subject to any disclaimer, the term of this patent is extended or adjusted under 35 U.S.C. 154(b) by 416 days.

(21) Appl. No.: 17/753,716

(22) PCT Filed: Sep. 13, 2019

(86) PCT No.: PCT/IB2019/057751
§ 371 (c)(1),
(2) Date: Mar. 11, 2022

(87) PCT Pub. No.: WO2021/048601
PCT Pub. Date: Mar. 18, 2021

(65) Prior Publication Data
US 2022/0349762 A1 Nov. 3, 2022

(51) Int. Cl.
*G01L 3/10* (2006.01)
*G01L 5/22* (2006.01)

(52) U.S. Cl.
CPC ............. *G01L 3/102* (2013.01); *G01L 5/221* (2013.01)

(58) Field of Classification Search
CPC .................................. G01L 3/102; G01L 5/221
See application file for complete search history.

(56) References Cited

U.S. PATENT DOCUMENTS

| 3,263,796 A | 8/1966 | Parke |
| 4,656,750 A | 4/1987 | Pitt et al. |

(Continued)

FOREIGN PATENT DOCUMENTS

| CA | 2073293 C | 11/1996 |
| CA | 3046180 A1 | 6/2018 |

(Continued)

OTHER PUBLICATIONS

English language abstract for JPH0116349B2 extracted from espacenet.com database on Aug. 1, 2019, 1 page.

(Continued)

*Primary Examiner* — Ryan D Walsh
(74) *Attorney, Agent, or Firm* — BCF LLP

(57) ABSTRACT

A torque sensor assembly including a shaft configured to receive an applied torque. The shaft includes at least one region being magnetoelastic and configured to generate a magnetic field in response to the applied torque. A plurality of sensors, circumferentially positioned around the at least one region, configured to generate a plurality of signals that are indicative of the magnetic field. Each of the plurality of signals includes multiple harmonic components. A controller is connected with the plurality of sensors and being configured to receive the plurality of signals and determine (i) an average of the plurality of signals in order to cancel at least one of the harmonic components of the multiple harmonic components for each of the plurality of signals, and (ii) a magnitude of the applied torque based on the average of the plurality of signals.

17 Claims, 9 Drawing Sheets

(56) References Cited

U.S. PATENT DOCUMENTS

| | | |
|---|---|---|
| 4,760,745 A | 8/1988 | Garshelis |
| 4,803,885 A * | 2/1989 | Nonomura ............. G01L 3/105 |
| | | 73/DIG. 2 |
| 4,882,936 A | 11/1989 | Garshelis |
| 4,896,544 A | 1/1990 | Garshelis |
| 4,989,460 A | 2/1991 | Mizuno et al. |
| 5,052,232 A | 10/1991 | Garshelis |
| 5,307,690 A | 5/1994 | Hanazawa |
| 5,321,985 A | 6/1994 | Kashiwagi et al. |
| 5,351,555 A | 10/1994 | Garshelis |
| 5,419,207 A | 5/1995 | Kobayashi et al. |
| 5,465,627 A | 11/1995 | Garshelis |
| 5,520,059 A | 5/1996 | Garshelis |
| 5,522,269 A | 6/1996 | Takeda et al. |
| 5,526,704 A | 6/1996 | Hoshina et al. |
| 5,562,004 A | 10/1996 | Kaise et al. |
| 5,589,645 A | 12/1996 | Kobayashi et al. |
| 5,591,925 A | 1/1997 | Garshelis |
| 5,706,572 A | 1/1998 | Garshelis |
| 5,708,216 A | 1/1998 | Garshelis |
| 5,887,335 A | 3/1999 | Garshells |
| 5,939,881 A | 8/1999 | Slater et al. |
| 6,047,605 A | 4/2000 | Garshelis |
| 6,145,387 A | 11/2000 | Garshelis |
| 6,222,363 B1 | 4/2001 | Cripe |
| 6,260,423 B1 | 7/2001 | Garshelis |
| 6,278,271 B1 | 8/2001 | Schott |
| 6,341,534 B1 | 1/2002 | Dombrowski |
| 6,490,934 B2 | 12/2002 | Garshelis |
| 6,499,559 B2 | 12/2002 | McCann et al. |
| 6,522,130 B1 | 2/2003 | Lutz |
| 6,553,847 B2 | 4/2003 | Garshelis |
| 6,581,480 B1 | 6/2003 | May et al. |
| 6,768,301 B1 | 7/2004 | Hohe et al. |
| 6,807,871 B1 | 10/2004 | Paek |
| 6,810,754 B2 | 11/2004 | May |
| 6,826,969 B1 | 12/2004 | May |
| 7,117,752 B2 | 10/2006 | May |
| 7,124,649 B2 | 10/2006 | May |
| 7,235,968 B2 | 6/2007 | Popovic et al. |
| 7,263,904 B2 | 9/2007 | Yoshida et al. |
| 7,302,867 B2 | 12/2007 | May |
| 7,305,882 B1 | 12/2007 | May |
| 7,308,825 B2 | 12/2007 | Hagg et al. |
| 7,308,835 B2 | 12/2007 | Cripe |
| 7,362,096 B2 | 4/2008 | Oberdier et al. |
| 7,363,827 B2 | 4/2008 | Hedayat et al. |
| 7,389,702 B2 | 6/2008 | Ouyang et al. |
| 7,391,211 B2 | 6/2008 | Cripe |
| 7,409,878 B2 | 8/2008 | Von Beck et al. |
| 7,469,604 B2 | 12/2008 | Hedayat et al. |
| 7,506,554 B2 | 3/2009 | Shimizu et al. |
| 7,845,243 B2 | 12/2010 | Poirier et al. |
| 7,895,906 B2 | 3/2011 | Hedayat et al. |
| 7,969,148 B2 | 6/2011 | Noguchi et al. |
| 8,001,849 B2 | 8/2011 | Weng |
| 8,001,850 B2 | 8/2011 | Hedayat et al. |
| 8,087,304 B2 | 1/2012 | Lee |
| 8,181,538 B2 | 5/2012 | Yamamura et al. |
| 8,191,431 B2 | 6/2012 | Hedayat et al. |
| 8,203,334 B2 | 6/2012 | Baller et al. |
| 8,316,724 B2 | 11/2012 | Ling et al. |
| 8,373,410 B2 | 2/2013 | Frachon |
| 8,424,393 B1 | 4/2013 | Lee |
| 8,468,898 B2 | 6/2013 | Baller et al. |
| 8,578,794 B2 | 11/2013 | Lee |
| 8,635,917 B2 | 1/2014 | Lee |
| 8,677,835 B2 | 3/2014 | Goto et al. |
| 8,701,503 B2 | 4/2014 | Shimizu et al. |
| 8,707,824 B2 | 4/2014 | Benkert et al. |
| 8,836,458 B2 | 9/2014 | Lee |
| 8,844,379 B2 | 9/2014 | Pietron et al. |
| 8,890,514 B2 | 11/2014 | Masson et al. |
| 8,893,562 B2 | 11/2014 | Barraco et al. |
| 9,024,622 B2 | 5/2015 | Hohe et al. |
| 9,151,686 B2 | 10/2015 | Barraco et al. |
| 9,254,863 B2 | 2/2016 | Kuwahara et al. |
| 9,284,998 B2 | 3/2016 | Gießibl |
| 9,347,845 B2 | 5/2016 | Gießibl |
| 9,494,661 B2 | 11/2016 | Paul et al. |
| 9,575,141 B2 | 2/2017 | Rohrer |
| 9,593,990 B2 | 3/2017 | Duan et al. |
| 9,683,906 B2 | 6/2017 | Gießibl |
| 10,151,652 B2 | 12/2018 | Giessibl |
| 10,983,019 B2 | 4/2021 | Panine |
| 11,486,776 B2 * | 11/2022 | Simard ................ G01L 5/0023 |
| 2001/0029791 A1 | 10/2001 | Sezaki |
| 2002/0162403 A1 | 11/2002 | Cripe |
| 2004/0119470 A1 | 6/2004 | Yajima et al. |
| 2005/0204830 A1 | 9/2005 | Kuroda et al. |
| 2005/0204831 A1 | 9/2005 | Mori et al. |
| 2007/0028709 A1 | 2/2007 | Futamura et al. |
| 2007/0034021 A1 | 2/2007 | Cripe |
| 2007/0096724 A1 | 5/2007 | Oberdier et al. |
| 2008/0048179 A1 | 2/2008 | Shin et al. |
| 2008/0221399 A1 | 9/2008 | Zhou et al. |
| 2009/0072818 A1 | 3/2009 | Mizuno et al. |
| 2010/0097059 A1 | 4/2010 | Estrada et al. |
| 2010/0156394 A1 | 6/2010 | Ausserlechner et al. |
| 2010/0263457 A1 * | 10/2010 | Yoneda ................ H01F 41/24 |
| | | 29/602.1 |
| 2010/0328799 A1 | 12/2010 | Braganca et al. |
| 2011/0106557 A1 | 5/2011 | Gazula |
| 2011/0162464 A1 | 7/2011 | Weng |
| 2012/0007597 A1 | 1/2012 | Seeger et al. |
| 2012/0007598 A1 | 1/2012 | Lo et al. |
| 2012/0074933 A1 | 3/2012 | Lee |
| 2012/0296577 A1 | 11/2012 | Garshelis et al. |
| 2013/0125669 A1 | 5/2013 | Barraco et al. |
| 2013/0181702 A1 | 7/2013 | May |
| 2013/0218517 A1 | 8/2013 | Ausserlechner |
| 2013/0285651 A1 | 10/2013 | Wan et al. |
| 2014/0195117 A1 | 7/2014 | Kuwahara et al. |
| 2014/0197820 A1 | 7/2014 | Ritter et al. |
| 2014/0197822 A1 | 7/2014 | Ritter et al. |
| 2014/0354270 A1 | 12/2014 | Kawano et al. |
| 2015/0057885 A1 | 2/2015 | Brady et al. |
| 2015/0230294 A1 | 8/2015 | Tonomura et al. |
| 2015/0253162 A1 | 9/2015 | Kusumi et al. |
| 2015/0274204 A1 | 10/2015 | Shiraishi et al. |
| 2016/0121924 A1 | 5/2016 | Norstad |
| 2016/0238472 A1 | 8/2016 | Giessibl |
| 2017/0324930 A1 | 11/2017 | Shaya |
| 2017/0356822 A1 | 12/2017 | Giessibl |
| 2017/0370788 A1 | 12/2017 | Neuschaefer-Rube et al. |
| 2018/0022386 A1 | 1/2018 | Watanabe et al. |
| 2018/0231425 A1 | 8/2018 | Raths Ponce et al. |
| 2019/0178683 A1 | 6/2019 | Tetreault et al. |
| 2020/0088594 A1 | 3/2020 | Simard |
| 2021/0229679 A1 | 7/2021 | Giessibl et al. |
| 2021/0278251 A1 | 9/2021 | Tetreault et al. |
| 2022/0034734 A1 | 2/2022 | Veillette et al. |
| 2023/0114412 A1 * | 4/2023 | Veillette ............... H10N 35/101 |
| | | 73/862.333 |

FOREIGN PATENT DOCUMENTS

| | | |
|---|---|---|
| CN | 2903949 Y | 5/2007 |
| CN | 102519633 A | 6/2012 |
| CN | 105277303 A | 1/2016 |
| DE | 3206503 C1 | 8/1983 |
| DE | 69936138 T2 | 2/2008 |
| DE | 102010033308 A1 | 2/2012 |
| DE | 102015202240 B3 | 2/2016 |
| DE | 102015102337 B4 | 11/2016 |
| EP | 0067974 A2 | 12/1982 |
| EP | 0217640 A2 | 4/1987 |
| EP | 0362890 A2 | 4/1990 |
| EP | 0609463 A1 | 8/1994 |
| EP | 0697602 A2 | 2/1996 |
| EP | 0947846 A2 | 10/1999 |
| EP | 1206707 A1 | 5/2002 |
| EP | 1211494 A1 | 6/2002 |
| EP | 1243905 A1 | 9/2002 |

(56) References Cited

FOREIGN PATENT DOCUMENTS

| | | |
|---|---|---|
| EP | 1319934 A2 | 6/2003 |
| EP | 1400795 A1 | 3/2004 |
| EP | 1518131 A1 | 3/2005 |
| EP | 1668378 A1 | 6/2006 |
| EP | 1795864 A1 | 6/2007 |
| EP | 1949057 A2 | 7/2008 |
| EP | 1950545 A2 | 7/2008 |
| EP | 2049910 A2 | 4/2009 |
| EP | 2260278 A2 | 12/2010 |
| EP | 2065691 B1 | 12/2011 |
| EP | 2447690 A2 | 5/2012 |
| EP | 2527857 A2 | 11/2012 |
| EP | 1386127 B1 | 1/2013 |
| EP | 2766740 A1 | 8/2014 |
| EP | 2793009 A1 | 10/2014 |
| EP | 2799327 A1 | 11/2014 |
| EP | 2799827 A1 | 11/2014 |
| EP | 2806283 A2 | 11/2014 |
| EP | 3256828 B1 | 7/2019 |
| JP | S60-143735 A | 7/1985 |
| JP | S6141935 A | 2/1986 |
| JP | S62-249026 A | 10/1987 |
| JP | H0116349 B2 | 3/1989 |
| JP | H01187425 A | 7/1989 |
| JP | H02280023 A | 11/1990 |
| JP | H02280024 A | 11/1990 |
| JP | H041542 A | 1/1992 |
| JP | H04191630 A | 7/1992 |
| JP | H0545240 A | 2/1993 |
| JP | H0566164 A | 3/1993 |
| JP | H05126654 A | 5/1993 |
| JP | H0540849 U | 6/1993 |
| JP | H0543040 U | 6/1993 |
| JP | H0545537 U | 6/1993 |
| JP | H05045538 U | 6/1993 |
| JP | H05231966 A | 9/1993 |
| JP | H05231967 A | 9/1993 |
| JP | H05346360 A | 12/1993 |
| JP | H06014939 U | 2/1994 |
| JP | H0674844 A | 3/1994 |
| JP | H0628673 U | 4/1994 |
| JP | H06047832 U | 6/1994 |
| JP | H06258158 A | 9/1994 |
| JP | H06300647 A | 10/1994 |
| JP | H06323930 A | 11/1994 |
| JP | H072943 U | 1/1995 |
| JP | H0780756 A | 3/1995 |
| JP | H07159258 A | 6/1995 |
| JP | H0743521 U | 8/1995 |
| JP | H085477 A | 1/1996 |
| JP | H08043216 A | 2/1996 |
| JP | H08293634 A | 11/1996 |
| JP | H0985587 A | 3/1997 |
| JP | H0995247 A | 4/1997 |
| JP | H09189624 A | 7/1997 |
| JP | 2001050830 A | 2/2001 |
| JP | 2002333375 A | 11/2002 |
| JP | 2002340701 A | 11/2002 |
| JP | 2003307460 A | 10/2003 |
| JP | 2004053433 A | 2/2004 |
| JP | 2004053434 A | 2/2004 |
| JP | 2004053435 A | 2/2004 |
| JP | 2004225096 A | 8/2004 |
| JP | 2004264188 A | 9/2004 |
| JP | 2005321272 A | 11/2005 |
| JP | 2006010669 A | 1/2006 |
| JP | 2006126130 A | 5/2006 |
| JP | 2007101427 A | 4/2007 |
| JP | 2007181327 A | 7/2007 |
| JP | 2008026160 A | 2/2008 |
| JP | 2009122042 A | 6/2009 |
| JP | 2010-249733 A | 11/2010 |
| JP | 2013053954 A | 3/2013 |
| JP | 2013053957 A | 3/2013 |
| JP | 2013-137302 A | 7/2013 |
| JP | 2015009602 A | 1/2015 |
| JP | 2015010870 A | 1/2015 |
| JP | 6071460 B2 | 2/2017 |
| KR | 20050075880 A | 7/2005 |
| KR | 20050093025 A | 9/2005 |
| KR | 20060054775 A | 5/2006 |
| KR | 20070004377 A | 1/2007 |
| WO | 9533982 A1 | 12/1995 |
| WO | 200118556 A1 | 3/2001 |
| WO | 200192906 A2 | 12/2001 |
| WO | 02/16881 A1 | 2/2002 |
| WO | 2003006922 A1 | 1/2003 |
| WO | 03071232 A1 | 8/2003 |
| WO | 200405873 A1 | 1/2004 |
| WO | 2004003585 A1 | 1/2004 |
| WO | 2005029106 A1 | 3/2005 |
| WO | 200554803 A1 | 6/2005 |
| WO | 2007092402 A2 | 8/2007 |
| WO | 2008017348 A2 | 2/2008 |
| WO | 2011119317 A1 | 9/2011 |
| WO | 2012016664 A2 | 2/2012 |
| WO | 2013053534 A1 | 4/2013 |
| WO | 2016127988 A1 | 8/2016 |
| WO | 2017011619 A1 | 1/2017 |
| WO | 2017199063 A1 | 11/2017 |
| WO | 2017214361 A1 | 12/2017 |
| WO | 2018109674 A1 | 6/2018 |
| WO | 2021048601 A1 | 3/2021 |

OTHER PUBLICATIONS

English language abstract for JPH01187425A extracted from espacenet.com database on Aug. 1, 2019, 1 page.
English language abstract for JPH02280023A extracted from espacenet.com database on Aug. 1, 2019, 1 page.
English language abstract for JPH02280024A extracted from espacenet.com database on Aug. 1, 2019, 1 page.
English language abstract for JPH041542A extracted from espacenet.com database on Aug. 1, 2019, 1 page.
English language abstract for JPH04191630A extracted from espacenet.com database on Aug. 1, 2019, 1 page.
English language abstract for JPH05126654A extracted from espacenet.com database on Aug. 1, 2019, 1 page.
English language abstract for JPH05231966A extracted from espacenet.com database on Aug. 1, 2019, 1 page.
English language abstract for JPH05231967A extracted from espacenet.com database on Aug. 1, 2019, 1 page.
English language abstract for JPH05346360A extracted from espacenet.com database on Aug. 1, 2019, 1 page.
English language abstract for JPH0545240A extracted from espacenet.com database on Aug. 1, 2019, 1 page.
English language abstract for JPH0566164A extracted from espacenet.com database on Aug. 1, 2019, 1 page.
English language abstract for JPH06258158A extracted from espacenet.com database on Aug. 1, 2019, 1 page.
English language abstract for JPH06300647A extracted from espacenet.com database on Aug. 1, 2019, 1 page.
English language abstract for JPH06323930A extracted from espacenet.com database on Aug. 1, 2019, 1 page.
English language abstract for JPH0674844A extracted from espacenet.com database on Aug. 1, 2019, 1 page.
English language abstract for JPH07159258A extracted from espacenet.com database on Aug. 1, 2019, 1 page.
English language abstract for JPH0780756A extracted from espacenet.com database on Aug. 1, 2019, 1 page.
English language abstract for JPH0843216A extracted from espacenet.com database on Aug. 1, 2019, 1 page.
English language abstract for JPH085477A extracted from espacenet.com database on Aug. 1, 2019, 1 page.
English language abstract for JPH09189624A extracted from espacenet.com database on Aug. 1, 2019, 1 page.
English language abstract for JPH0985587A extracted from espacenet.com database on Aug. 1, 2019, 1 page.

(56) References Cited

OTHER PUBLICATIONS

English language abstract for JPH0995247A extracted from espacenet.com database on Aug. 1, 2019, 1 page.
English language abstract for JPS6141935A extracted from espacenet.com database on Aug. 1, 2019, 1 page.
English language abstract for KR20070004377A extracted from espacenet.com database on Aug. 1, 2019, 1 page.
English language abstract for WO 2012/016664 A2 A extracted from espacenet.com database on Apr. 25, 2021, 1 page.
English language abstract for WO 2016/127988 A1 extracted from espacenet.com database on May 18, 2022, 1 page.
English language abstract for WO0118556A1 extracted from espacenet.com database on Jan. 7, 2019, 2 pages.
English language abstract for WO2004005873A1 extracted from espacenet.com database on Aug. 1, 2019, 2 pages.
English language abstract for WO2005029106A1 extracted from espacenet.com database on Jan. 7, 2019, 2 pages.
English language abstract for WO2005054803A1 extracted from espacenet.com database on Aug. 1, 2019, 2 pages.
English language abstract for WO2008017348A2 extracted from espacenet.com database on Jan. 7, 2019, 2 pages.
English language abstract for WO2013053534A1 extracted from espacenet.com database on Jan. 7, 2019, 1 page.
International Search Report for Application No. PCT/IB2016/052876 dated Jan. 19, 2017, 4 pages.
International Search Report for Application No. PCT/IB2017/057858 dated Mar. 29, 2018, 5 pages.
International Search Report for Application No. PCT/IB2020/051099 dated Nov. 18, 2020, 4 pages.
Microelectronic Integrated Systems (Melexis), "MLX90333—Position Sensor Data Sheet", Revision 008, Sep. 26, 2017, 48 pages.
Microelectronic Integrated Systems (Melixis), "MLX90316 Rotary Position Sensor IC Manual", Revision 10, Jul. 2013, pp. 1-45.
Microelectronic Integrated Systems (Melixis), "MLX90363 Triaxis Magnetometer IC With High Speed Serial Interface Data Sheet", Revision 005, Jul. 2013, pp. 1-57.
Moving Magnet Technologies SA (MMT), "Magnetic Field Angle Position Sensors and Rotary Sensors", http://www.movingmagnet.com/en/analog-magnetic-field-angle-measurement/, 2016, 1 page.
Poincare, Jules Henri, "Exploring Magnetism—Session 1: Magnetism", http://cse.ssl.berkeley.edu/SegwayEd/lessons/exploring_magnetism/Exploring_Magnetism/s1.html, 2016, 6 pages.
Regents of the University of California Berkeley, "Exploring Magnetism—Session 1", http://cse.ssl.berkeley.edu/SegwayEd/lessons/exploring_magnetism/Exploring_Magnetism/s1.html, 2005, 6 pages.
Supplementary European Search Report for Application EP 16 90 2283.7 dated Nov. 18, 2019, 2 pages.
Supplementary European Search Report for Application EP 17 88 0586 dated.Jun. 23, 2020, 2 pages.
Japanese and English versions of the Office Action issued from the Japanese Patent Office on Apr. 18, 2023, during the prosecution of corresponding application 2022-516028.
Banks, Kevin, "The Goertzel Algorithm", Aug. 28, 2002, https://www.embedded.com/design/configurable-systems/4024443/The-Goertzel-Algorithm#, 5 pages.
Computer-Assisted English language abstract for EP2806283A2 extracted from espacenet.com database on Jan. 7, 2019, 4 pages.
Computer-generated English language abstract for DE 10 2015 102 337 B4 extracted from espacenet.com database on Mar. 17, 2022, 4 pages.
Computer-generated English language abstract for DE 10 2015 202 240 B3 extracted from espacenet.com database on Jul. 29, 2020, 2 pages.
Computer-generated English language translation for JPH0540849U extracted from espacenet.com database on Aug. 1, 2019, 7 pages.
Computer-generated English language translation for JPH0543040U extracted from espacenet.com database on Aug. 1, 2019, 6 pages.
Computer-generated English language translation for JPH0545537U extracted from espacenet.com database on Aug. 1, 2019, 9 pages.
Computer-generated English language translation for JPH0545538U extracted from espacenet.com database on Aug. 1, 2019, 8 pages.
Computer-generated English language translation for JPH0614939U extracted from espacenet.com database on Aug. 1, 2019, 10 pages.
Computer-generated English language translation for JPH0628673U extracted from espacenet.com database on Aug. 1, 2019, 6 pages.
Computer-generated English language translation for JPH0647832U extracted from espacenet.com database on Aug. 1, 2019, 9 pages.
Computer-generated English language translation for JPH072943U extracted from espacenet.com database on Aug. 1, 2019, 8 pages.
Computer-generated English language translation for JPH0743521U extracted from espacenet.com database on Aug. 1, 2019, 8 pages.
Computer-generated English language translation for KR20050075880A extracted from espacenet.com database on Aug. 1, 2019, 4 pages.
Computer-generated English language translation for KR20050093025A extracted from espacenet.com database on Aug. 1, 2019, 4 pages.
Computer-generated English language translation for KR20060054775A extracted from espacenet.com database on Aug. 1, 2019, 4 pages.
English language abstract for CN 102519633 A extracted from espacenet.com database on Apr. 25, 2021, 1 page.
English language abstract for CN 1105277303 A extracted from espacenet.com database on Apr. 25, 2021, 1 page.
English language abstract for CN2903949Y extracted from espacenet.com database on Aug. 1, 2019, 1 page.
English language abstract for DE 10 2010 033 308 A1 extracted from espacenet.com database on Apr. 25, 2021, 2 pages.
English language abstract for DE 69 936 138 T2 extracted from espacenet.com database on Mar. 17, 2022, 1 page.
English language abstract for DE3206503C1 extracted from espacenet.com database on Aug. 1, 2019, 1 page.
English language abstract for EP 1243905A1 extracted from espacenet.com database on Jul. 17, 2019, 1 page.
English language abstract for EP 3 256 828 B1 extracted from espacenet.com database on Apr. 25, 2021, 1 page (see also English language equivalent U.S. 2017/0370788 A1 previously cited in SB08/IDS on Aug. 3, 2020).
English language abstract for EP0947846A2 extracted from espacenet.com database on Jan. 7, 2019, 1 page.
English language abstract for EP1243905A1 extracted from espacenet.com database on Aug. 1, 2019, 1 page.
English language abstract for EP1319934a2 extracted from espacenet.com database on Aug. 1, 2019, 2 pages.
English language abstract for JP 6071460 B2 extracted from espacenet.com database on May 18, 2022, 2 pages.
English language abstract for JP2001050830A extracted from espacenet.com database on Aug. 1, 2019, 1 page.
English language abstract for JP2002333375A extracted from espacenet.com database on Aug. 1, 2019, 1 page.
English language abstract for JP2002340701A extracted from espacenet.com database on Aug. 1, 2019, 1 page.
English language abstract for JP2003307460A extracted from espacenet.com database on Aug. 1, 2019, 1 page.
English language abstract for JP2004053433A extracted from espacenet.com database on Aug. 1, 2019, 1 page.
English language abstract for JP2004053434A extracted from espacenet.com database on Aug. 1, 2019, 1 page.
English language abstract for JP2004053435A extracted from espacenet.com database on Aug. 1, 2019, 1 page.
English language abstract for JP2004225096A extracted from espacenet.com database on Aug. 1, 2019, 1 page.
English language abstract for JP2004264188A extracted from espacenet.com database on Aug. 1, 2019, 1 page.
English language abstract for JP2005321272A extracted from espacenet.com database on Aug. 1, 2019, 1 page.
English language abstract for JP2006010669A extracted from espacenet.com database on Aug. 1, 2019, 1 page.
English language abstract for JP2006126130A extracted from espacenet.com database on Aug. 1, 2019, 1 page.
English language abstract for JP2007101427A extracted from espacenet.com database on Aug. 1, 2019, 1 page.
English language abstract for JP2007181327A extracted from espacenet.com database on Aug. 1, 2019, 1 page.

(56) References Cited

OTHER PUBLICATIONS

English language abstract for JP2008026160A extracted from espacenet.com database on Aug. 1, 2019, 1 page.
English language abstract for JP2009122042A extracted from espacenet.com database on Aug. 1, 2019, 1 page.
English language abstract for JP2013053954A extracted from espacenet.com database on Aug. 1, 2019, 1 page.
English language abstract for JP2013053957A extracted from espacenet.com database on Aug. 1, 2019, 1 page.
English language abstract for JP2015009602A extracted from espacenet.com database on Aug. 1, 2019, 1 page.
English language abstract for JP2015010870A extracted from espacenet.com database on Aug. 1, 2019, 1 page.
English language abstract for JPH 08-293634 A extracted from espacenet.com database on Apr. 25, 2021, 2 pages.

* cited by examiner

MAGNETOELASTIC TORQUE SENSOR ASSEMBLY FOR REDUCING MAGNETIC ERROR DUE TO HARMONICS

CROSS-REFERENCE TO RELATED APPLICATIONS

This application is the National Stage of International Patent Application No. PCT/IB2019/057751, filed on Sep. 13, 2019, the contents of which are incorporated herein by reference.

TECHNICAL FIELD

The present disclosure relates generally to systems, sensors, and methods of measuring applied torque using magnetoelastic techniques.

BACKGROUND

A magnetoelastic torque sensor assembly measures applied torque. The magnetoelastic torque sensor assembly comprises a shaft which receives the applied torque. The shaft comprises magnetoelastic regions, the magnetic characteristics of which change in response to the applied torque. A plurality of sensors are disposed along the shaft, near the magnetoelastic regions, and measure the magnetic fields generated by the magnetoelastic regions. In this way, the torque sensor assembly is able to detect changes in applied torque via the measured magnetic fields.

SUMMARY

One example of a torque sensor assembly is provided. A shaft configured to receive an applied torque. The shaft includes at least one region being magnetoelastic and configured to generate a magnetic field in response to the applied torque. The torque sensor assembly includes a plurality of sensors, circumferentially positioned around the at least one region, that are configured to generate a plurality of signals that are indicative of the magnetic field. Each of the plurality of signals includes multiple harmonic components. The torque sensor assembly includes a controller connected with the plurality of sensors and being configured to receive the plurality of signals and determine (i) an average of the plurality of signals in order to cancel at least one of the harmonic components of the multiple harmonic components for each of the plurality of signals, and (ii) a magnitude of the applied torque based on the average of the plurality of signals.

One example of a method of operating a torque sensor assembly is provided. The torque sensor assembly comprising a shaft that is configured to receive an applied torque. The shaft includes at least one region being magnetoelastic, a plurality of sensors circumferentially positioned around the at least one region and being spaced equidistant from each other, and a controller connected with the plurality of sensors. The method includes sensing a magnetic field in response to the applied torque. The method further includes generating a plurality of signals that are indicative of the magnetic field. Each of the plurality of signals includes multiple harmonic components. The method further includes receiving the plurality of signals. The method further includes determining an average of the plurality of signals in order to cancel at least one of the harmonic components of the multiple harmonic components for each of the plurality of signals. The method further includes determining a magnitude of the applied torque based on the average of the plurality of signals.

One embodiment of a vehicle electronic power steering system is provided. The system includes a vehicular component that is configured to provide an applied torque and a torque sensor assembly configured to be coupled with the vehicular component. The torque sensor assembly includes a shaft configured to receive an applied torque. The shaft includes at least one region being magnetoelastic and configured to generate a magnetic field in response to the applied torque. The torque sensor assembly also includes a plurality of sensors circumferentially positioned around the at least one region and being configured to generate a plurality of signals that are indicative of the magnetic field. Each of the plurality of signals includes multiple harmonic components. The torque sensor assembly also includes a controller connected with the plurality of sensors and being configured to receive the plurality of signals, and determine (i) an average of the plurality of signals in order to cancel at least one of the harmonic components of the multiple harmonic components for each of the plurality of signals, and (ii) a magnitude of the applied torque based on the average of the plurality of signals.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
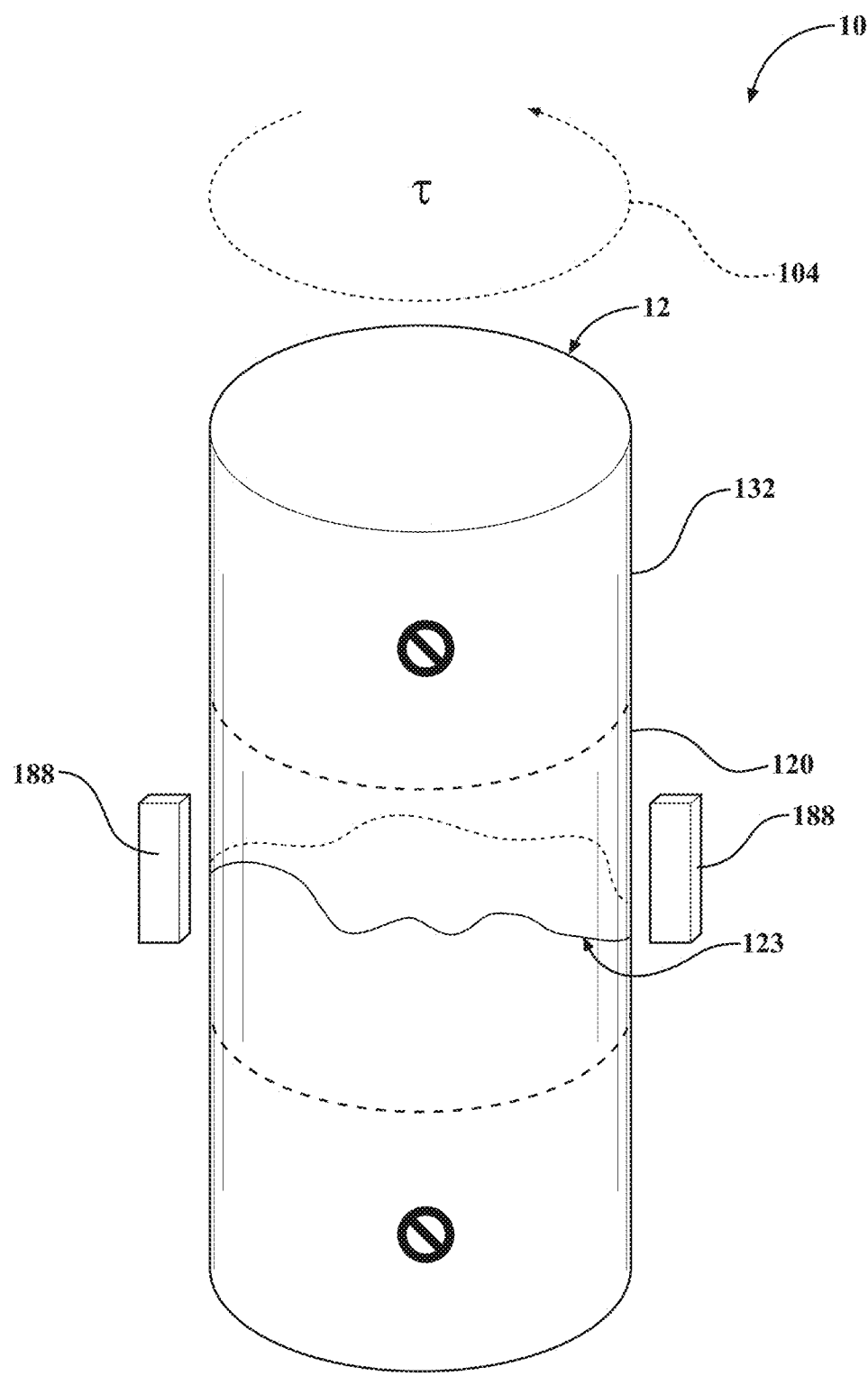
FIG. 1 is a perspective view of an example magnetoelastic torque sensor assembly according to the teaching of the present disclosure.

FIG. 1 illustrates a perspective view of a torque sensor assembly 10 for measuring a magnitude of the applied torque 104. The torque sensor assembly 10 may be utilized in a suitable component or system where an applied torque 104 is measured. For example, the torque sensor assembly 10 may be utilized in, but not limited to, vehicular systems, such as electric power steering systems.

With reference to FIG. 1, the shaft 12 of the torque sensor assembly 10 includes a magnetoelastic region 120 and non-magnetoelastic regions 132. A region may be magnetoelastic if it generates a change in a magnetic field under mechanical stress. A region may not be magnetoelastic if it generates a negligible change in a magnetic field under mechanical stress. A plurality of sensors 188 of the torque sensor assembly 10 may be disposed next to the magnetoelastic region 120 and may be configured to generate a magnetic field signal indicative of the magnitude of the magnetic field generated by the magnetoelastic region 120.

Figure 10:
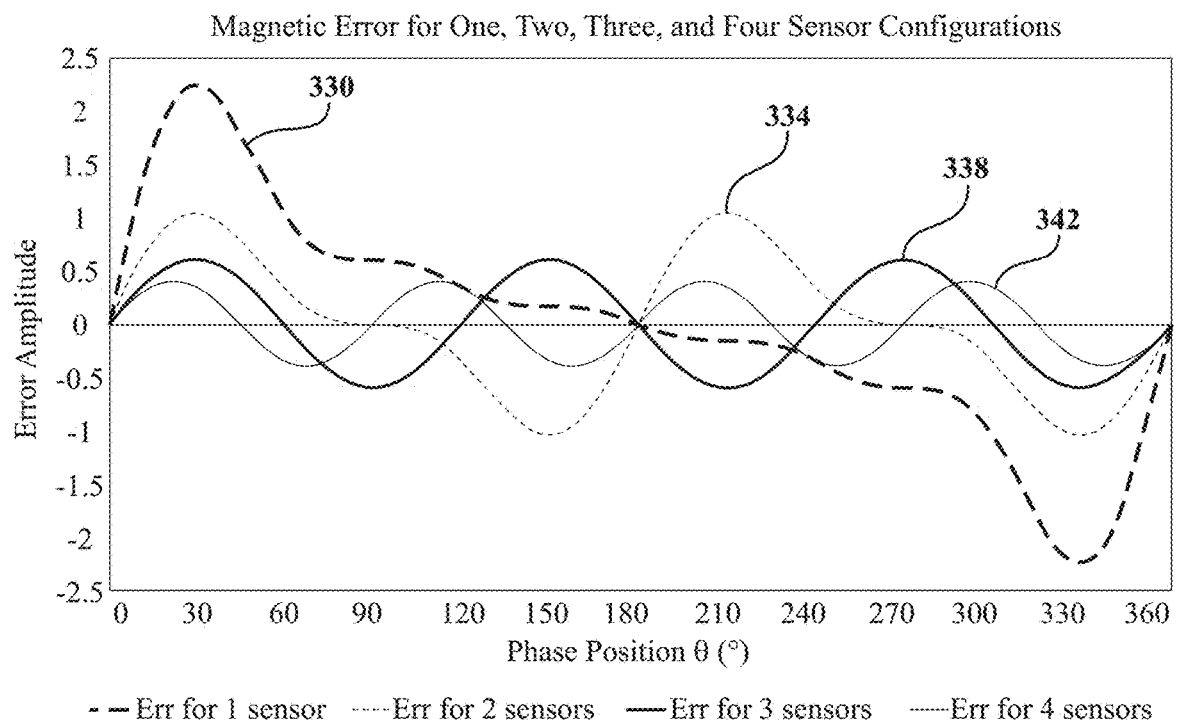
FIG. 10 depicts the magnetic error for one, two, three, and four sensor configurations of the magnetoelastic torque sensor assembly according to the teachings of the present disclosure.

Under optimal circumstances, the magnetic field would be uniform across the circumference of the shaft 12 when there is no applied torque or when there is a constant torque applied. However, for a variety of different factors, the magnetoelastic region 120 may generate a magnetic field signal 123 that is non-uniform and has an offset angle that is dependent on an angular position of the plurality of sensors 188. The non-uniformity of the magnetic field signal 123 (as shown in FIG. 10) may be caused by the manufacturing process of the shaft 12, the microstructure of material of the shaft 12, or caused during the magnetization process of the magnetoelastic region 120 of the shaft 12.

A magnetic error can be defined as the difference between the ideal waveform of the magnetic field detected by the plurality of sensors 188 and the actual waveform for the magnetic field detected by the plurality of sensors 188. The magnetic error may be caused by the non-uniformity of the magnetic field signal 123. According to the teachings of the present disclosure, a torque sensor assembly 10 is provided that reduces the magnetic error by removing one or more harmonic components from the magnetic field signal 123 of the torque sensor assembly 10 which is discussed in more detail herewith.

Figure 2:
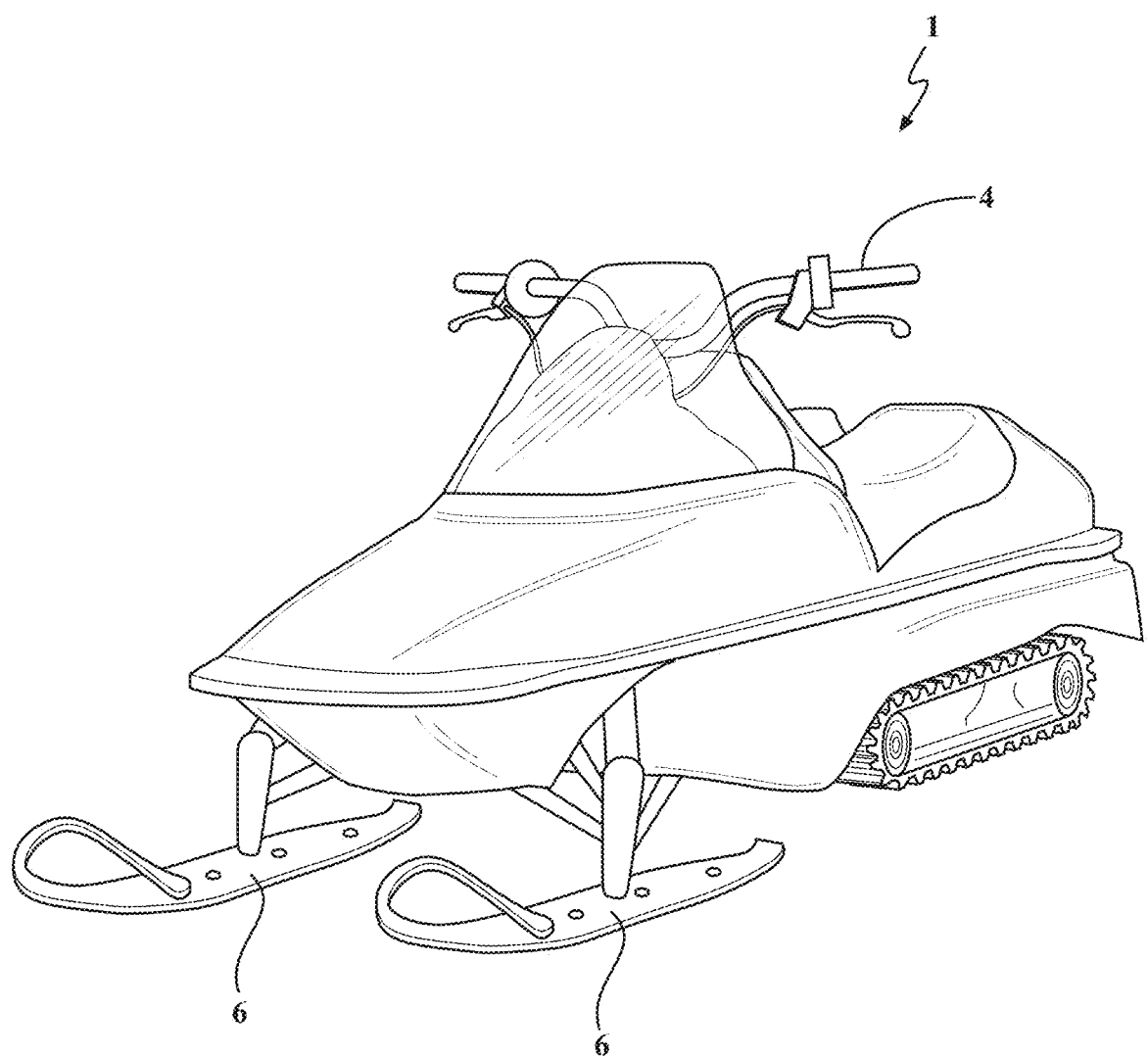
FIG. 2 is a perspective view of an example vehicle which may incorporate a magnetoelastic torque sensor assembly according to the teachings of the present disclosure.
Figure 3:
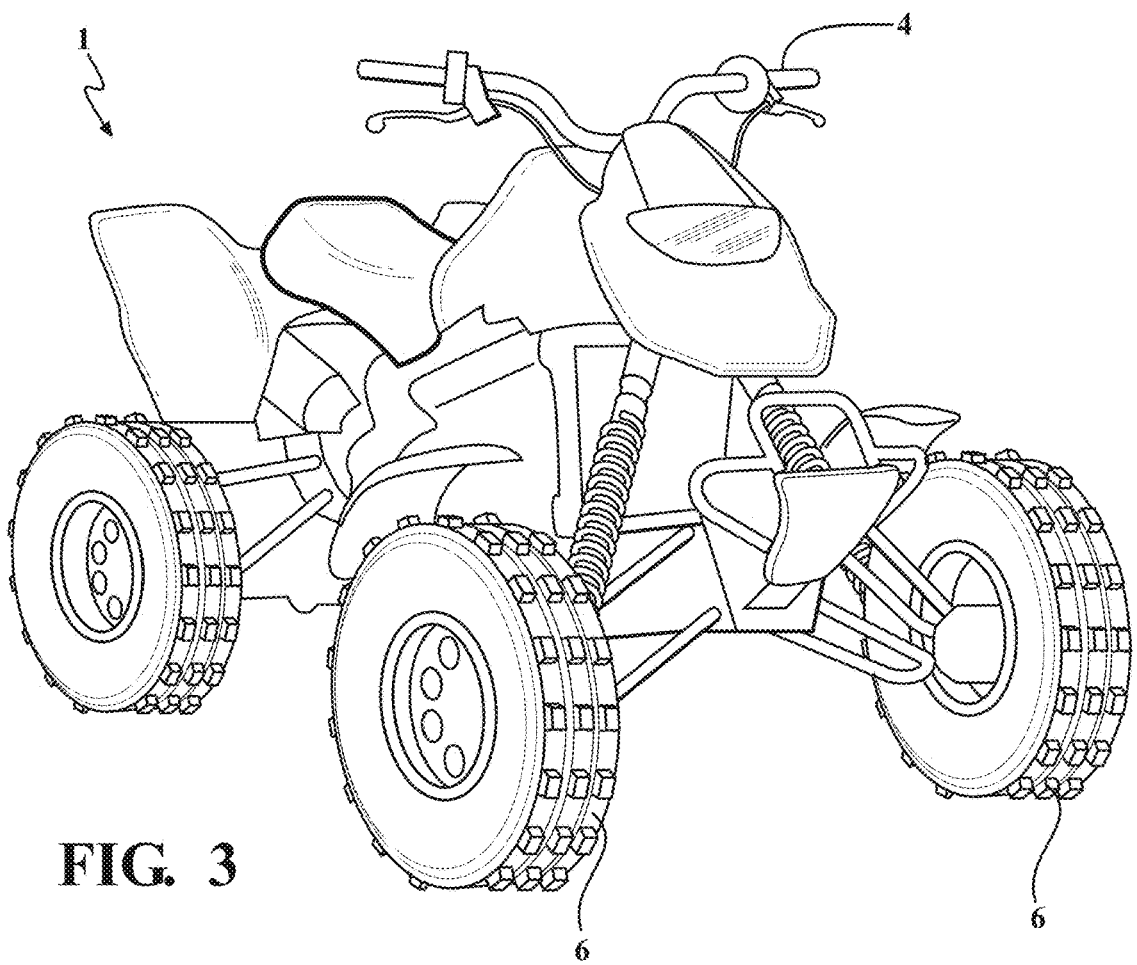
FIG. 3 is a perspective view of another example vehicle which may incorporate a magnetoelastic torque sensor assembly according to the teachings of the present disclosure.

Referring to FIGS. 2 and 3, the torque sensor assembly 10 may be used in an example vehicle 1. The vehicle 1 may be a snowmobile, an all-terrain vehicle (ATV) such as a four wheeler or a three wheeler, a motorcycle, a standard car, a full size or standard size truck, a semi-truck, etc. While examples of the vehicle 1 are provided, the vehicle 1 is not limited to these examples, the vehicle 1 may be another suitable type of vehicle.

Figure 4:
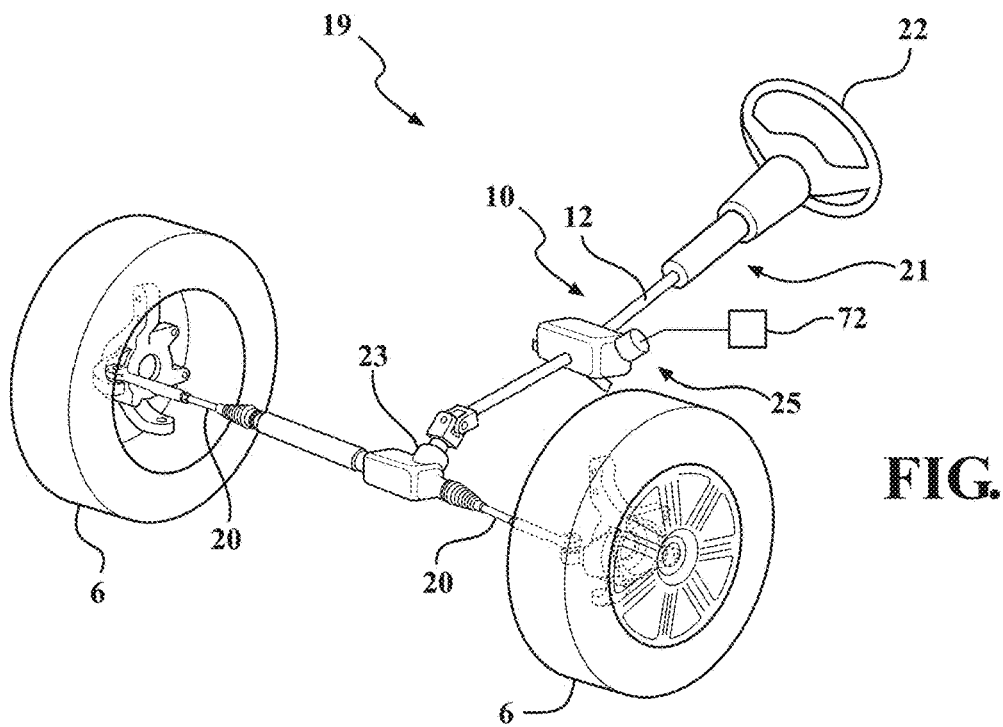
FIG. 4 is a perspective view of a power steering system including a magnetoelastic torque sensor assembly according to the teachings of the present disclosure.

The torque sensor assembly 10 may be utilized in a steering assembly 19 of the vehicle 1. Referring to FIG. 4, an example steering assembly 19 of the vehicle 1 is shown. The steering assembly 19 additionally includes a power steering system 25. The power steering system 25 is an electric power steering system. However, it is contemplated that the power steering system 25 may be any power steering system. The power steering system 25 includes a controller 72 which may receive and deliver various inputs and outputs to and from various portions of the vehicle 1. The controller may be configured to communicate with various components in the vehicle 1 using a communication protocol such as a local interconnect network (LIN), a controller area network (CAN), or another suitable communication protocol. Additionally, the controller 72 may be configured to control the torque sensor assembly 10. The controller 72 may perform various control operations in order to determine an amount of applied torque, as described in more detail herewith.

The steering assembly 19 includes a steering column 21 coupled to a steering rack 23 which is coupled to ground engaging members 6. It is also contemplated that the steering assembly 19 may comprise any mechanical link between the steering column 21 and the ground engaging members 6, but not limited to, linkages. The ground engaging members 6 may include a sled or tire, as shown in FIGS. 2 and 3, or another suitable ground engaging members. Generally, the ground engaging members 6 are coupled to steering rods 20. Movement of a user operated steering element 22, such as a steering wheel 22 in FIG. 4 or handlebars 4 as illustrated in FIGS. 2 and 3, on the vehicle 1 causes movement of the steering rods 20 which turn the ground engaging members 6. It is additionally contemplated that the steering assembly 19 may be another suitable user operated steering assembly 19.

Figure 5:
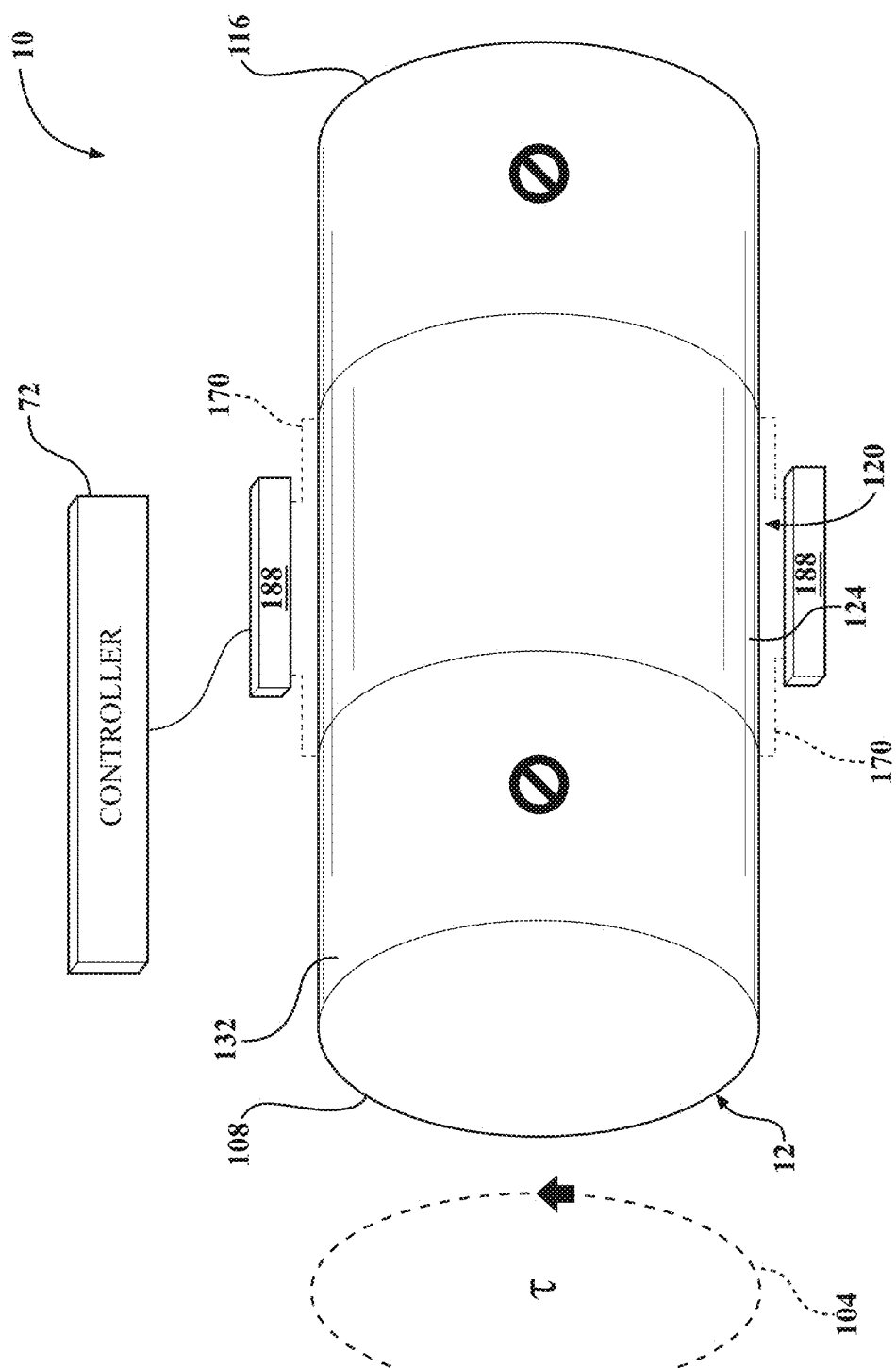
FIG. 5 depicts a diagrammatic view of one example of the magnetoelastic torque sensor assembly according to the teachings of the present disclosure.

With reference to FIG. 5, a diagrammatic view of one example of a magnetoelastic torque sensor assembly 10 according to the teachings of the present disclosure. The applied torque 104 having magnitude $\tau$ is applied to a first end 108 of the shaft 12 of the torque sensor assembly 10. However, the applied torque 104 may be applied to any section of the torque sensor assembly 10. For example, the applied torque 104 may be applied to a second end 116 of the torque sensor assembly 10 or at any point between ends 108, 116 of the torque sensor assembly 10. Furthermore, the applied torque 104 may be applied to more than one section of the torque sensor assembly 10. Additionally, the applied torque 104 may be applied in clockwise or counterclockwise direction when looking at the first end 108 of the shaft 12. Depending on the system that utilizes the torque sensor assembly 10, the applied torque 104 may be applied in either or both directions.

Although the shaft 12, as shown in FIG. 5, has a cylindrical configuration, the shaft 12 may have any suitable shape defining any suitable cross-sectional area (e.g. a square, a triangle, an oval, an octagon, etc.) for enabling the torque sensor assembly 10 to properly function. Additionally, in other embodiments, the shaft 12 may be hollow or solid. Furthermore, in some embodiments, the shaft 12 may be stationary and fixed at ends 108, 116 to a larger system, which enables application of the applied torque 104 to deform the shaft 12. In other embodiments, the shaft 12 may rotate upon application of the applied torque 104.

As shown in FIG. 5, the shaft 12 includes the magnetoelastic region 120 that may be magnetized to generate a magnetic field in response to the applied torque 104 being applied to the shaft 12. In some embodiments, the magnetoelastic region 120 may be magnetized circumferentially to carry a positive or negative polarity. The magnetoelastic region 120 may generate a magnetic field 170, which may be composed of an axial magnetic field component and a radial magnetic field component. When the applied torque 104 is applied to the shaft 12, the applied torque 104 may alter a magnitude of the axial and radial components of the magnetic field in proportion to the magnitude of the applied torque 104. The shaft 12 may include multiple sequences of the magnetoelastic region 120 and multiple sequences of non-magnetoelastic portions as discussed in further detail with respect to FIG. 6.

The torque sensor assembly 10 may also include a plurality of sensors 188 disposed surrounding the magnetoelastic region 120. The plurality of sensors 188 may include any suitable sensor for sensing a magnetic field. For example, the plurality of sensors 188 may include at least one of a Hall Effect sensor, a giant magnetoresistance magnetometer, an AMR magnetometer, a magneto-optical sensor, a search coil magnetic field sensor, a magnetodiode, a fluxgate magnetometer, or any other sensor suitable for sensing a magnetic field.

The plurality of sensors 188 may be configured to sense the magnetic field 170 generated by the magnetoelastic region 120. As shown, the plurality of sensors 188 may be configured to sense the magnitude of the axial magnetic field component of the magnetic field 170. It should be noted that, in other embodiments, the plurality of sensors 188 may be configured to sense the magnitude of the radial component of the magnetic field 170 or the axial and radial components of the magnetic field 170. As such, the plurality of sensors 188 may be configured to produce a reading of the magnetic field 170. The plurality of sensors 188 may also be configured to sense the magnitude of the ambient magnetic field in addition to the magnetic fields 170. As such, the plurality of sensors 188 may be configured to produce a reading of the ambient magnetic field in addition to a reading of the magnetic field 170.

Figure 6:
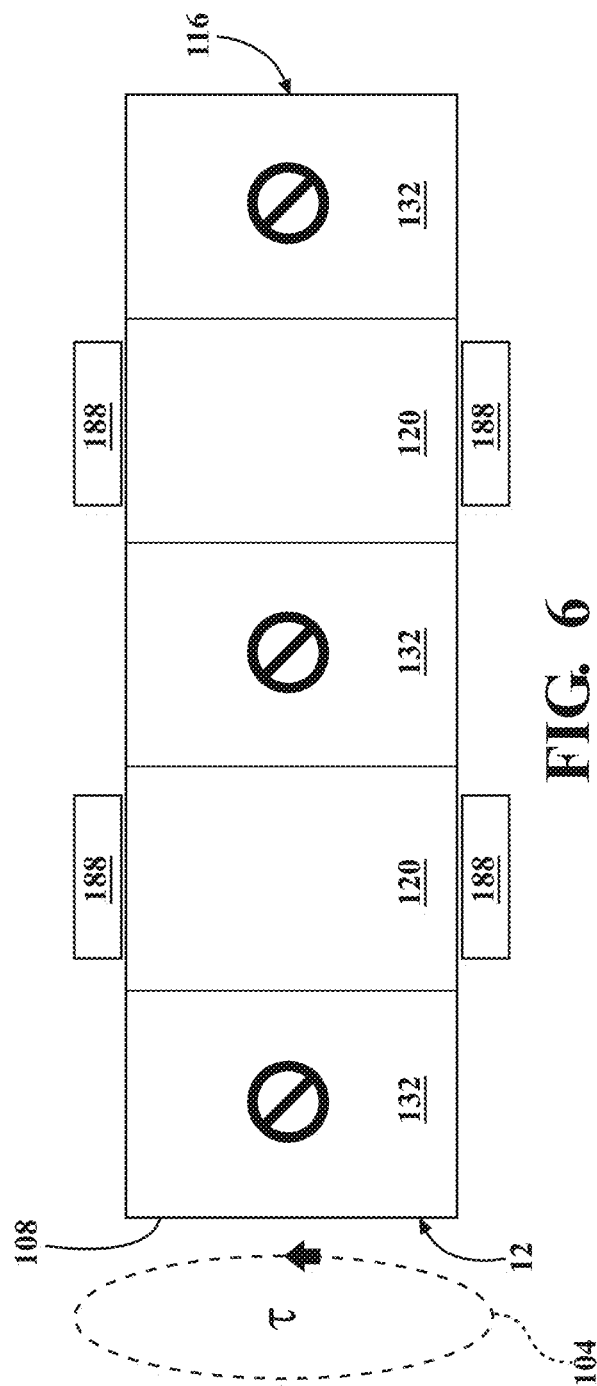
FIG. 6 depicts a diagrammatic view of an example embodiment of the magnetoelastic torque sensor assembly according to the teachings of the present disclosure.

With reference to FIG. 6, an alternative configuration of the shaft 12 of the torque sensor assembly 10 is shown. FIG. 6 shows that the toque sensor assembly 10 may include multiple sequences of the magnetoelastic region 120 and multiple sequences of the non-magnetoelastic regions 132. In FIG. 6, the shaft 12 includes three non-magnetized regions 132 and two magnetoelastic regions 120.

The non-magnetized regions 132 are configured to generate a substantially negligible magnetic field in response to the applied torque 104. In other words, the magnetic field may be minimal when compared to the magnetic field generated by the magnetoelastic portions 120 and may be treated as negligible when determining the applied torque 104.

The plurality of sensors need not be directly connected to the shaft 12. For example, in one embodiment, the plurality of sensors 188 may be disposed in a housing that may be adjacent to, but spaced from, the shaft 12. As such, the plurality of sensors 188 and the housing do not influence the applied torque 104 through friction. The plurality of sensors 188 may include any number of sensors, in particular three and four sensors as described with respect to FIGS. 7 and 8, and may be configured to sense a magnetic field of any polarity.

In some embodiments, the plurality of sensors 188 may be configured to sense an ambient magnetic field. The ambient magnetic field may be generated by sources external to the torque sensor assembly 10, such that the applied torque 104 has a minimal effect on the ambient magnetic field. For example, in an embodiment where the torque sensor assembly 10 may be utilized by an electric power steering unit, the ambient magnetic field may be a magnetic field generated by components of the electric power steering unit not including the torque sensor assembly 10.

Figure 7:
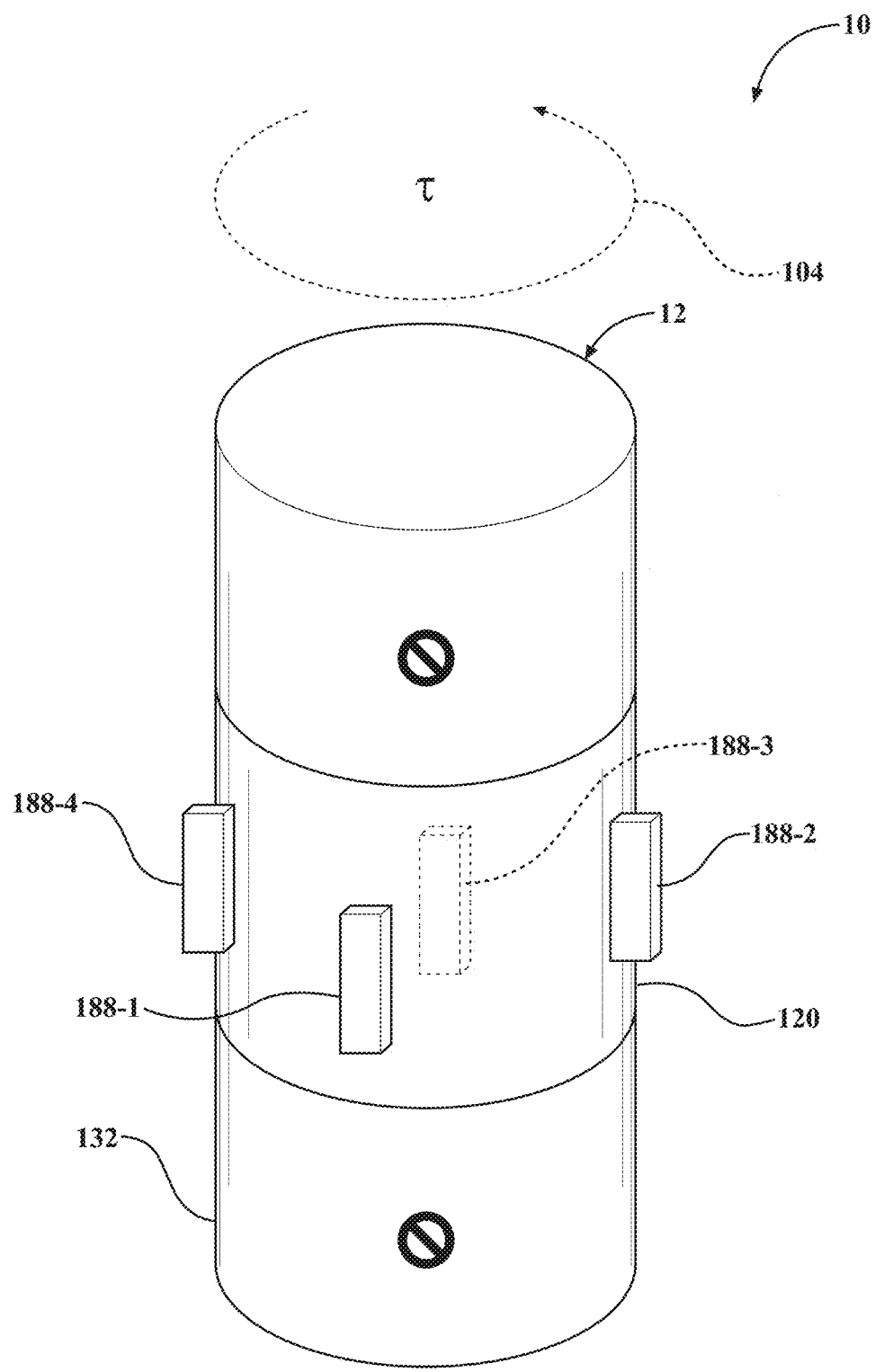
FIG. 7 depicts a perspective view of one example of the magnetoelastic torque sensor assembly according to the teachings of the present disclosure.

With reference to FIG. 7, an example implementation of the torque sensor assembly 10 is shown. While FIG. 6 shows a different configuration of the magnetoelastic region 120, the remainder of the disclosure will be discussed in terms of a single magnetoelastic region 120; however, it is understood that the teachings disclosed hereinafter are applicable to the various configurations disclosed in FIG. 6 and may be extended to any configuration of the shaft 12.

The plurality of sensors 188 includes a first sensor 188-1, a second sensor 188-2, a third sensor 188-3, and a fourth sensor 188-4 that are positioned at substantially equal distances circumferentially surrounding the shaft 12. The first sensor 188-1 and the third sensor 188-3 may be diametrically opposed to each other while the second sensor 188-2 and the fourth sensor 188-4 may also be diametrically opposed to each other. For example, the first sensor 188-1 may be positioned at 0°, the second sensor 188-2 may be positioned at 90°, the third sensor 188-3 may be positioned at 180°, and the fourth sensor 188-4 may be positioned at 270°. The spacing or distance between each sensor of the plurality of sensors 188 may be defined as follows:

$$D_S = \frac{360°}{n} \qquad \text{(Equation 1)}$$

where $D_S$ is the distance in degrees between each sensor and n is equal to a number of the plurality of sensors 188.

Figure 8:
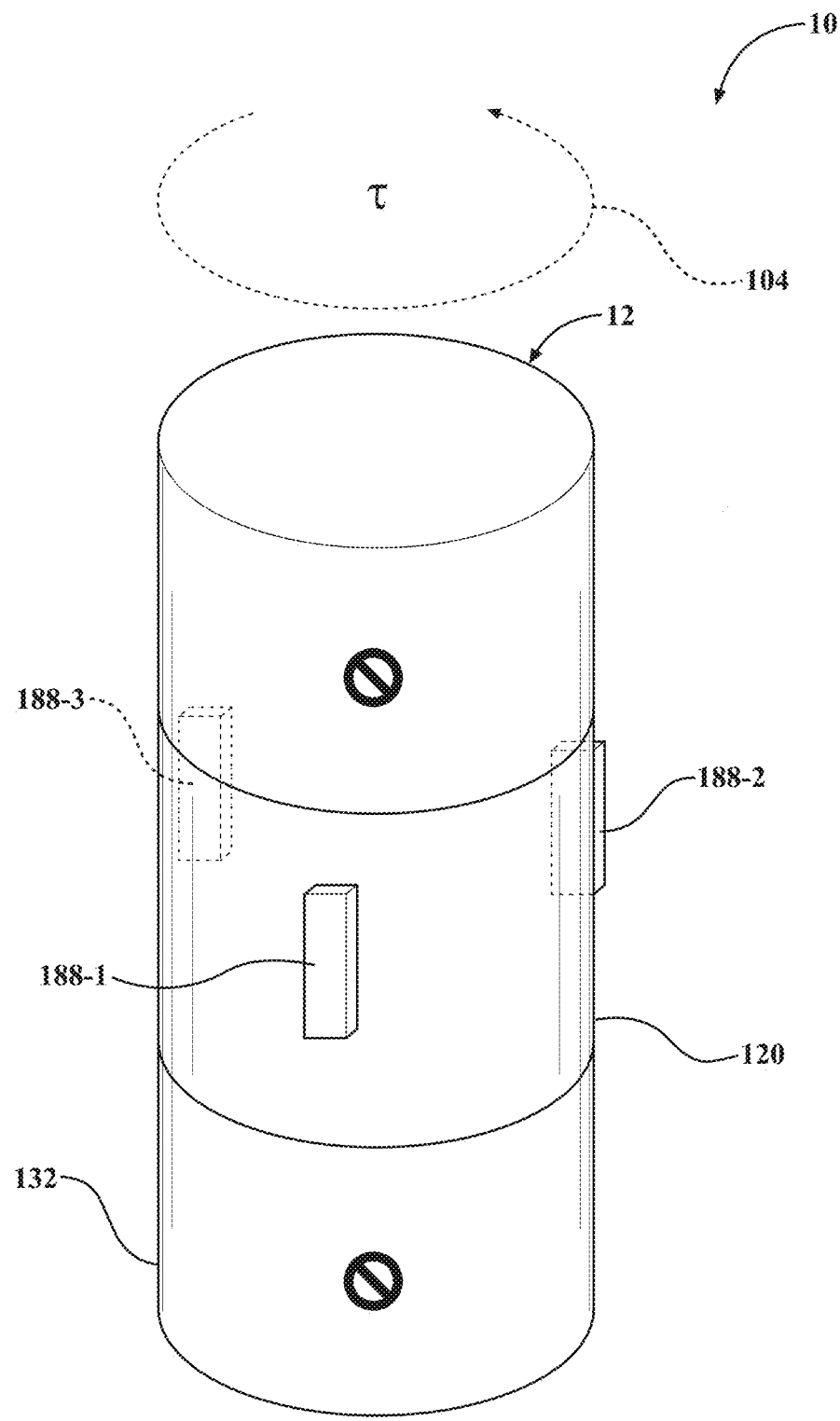
FIG. 8 depicts a perspective view of one example of the magnetoelastic torque sensor assembly according to the teachings of the present disclosure.

With reference to FIG. 8, an implementation is shown where the plurality of sensors 188 includes three sensors. For example, the first sensor 188-1, the second sensor 188-2, and the third sensor 188-3 are shown spaced equidistance from each other at 120° apart. The first sensor 188-1 is positioned at 0°, the second sensor 188-2 is positioned at 120°, and the third sensor is positioned at 240°.

Referring back to FIG. 5, the plurality of sensors 188 output a plurality of signals indicative of the detected magnetic field 170. For example, the first sensor 188-1 outputs a first signal that is indicative of the magnetic field 170 as detected by the first sensor 188-1. The second sensor 188-2 outputs a second signal that is indicative of the magnetic field 170 as detected by the second sensor 188-2. The third sensor 188-3 outputs a third signal that is indicative of the magnetic field 170 as detected by the third sensor 188-3. The fourth sensor 188-4 outputs a fourth signal that is indicative of the magnetic field 170 as detected by the fourth sensor 188-4.

The controller 72 determines an amount of applied torque 104 based on the plurality of first signals. The controller may include an averaging module and a torque determination module. The remainder of the disclosure describes various embodiments of the controller 72 in terms of the plurality of sensors 188 and the magnetic field 170; however, it is understood that the various embodiments as described hereinafter are equally applicable to the different configurations described above.

Each of the plurality of signals includes multiple harmonics components. The multiple harmonics components of each of the plurality of signals generally result in distortion of each the plurality of signals and are undesirable. The magnetic error, as previously discussed, may be defined as the difference between the ideal waveform for each of the plurality of signals and the actual waveform for each of the plurality of signals. The multiple harmonics components may be exacerbated by the non-uniformity of the magnetoelastic region 120 of the shaft 12.

The sensor averaging module may include an error module that calculates an error for each of the plurality of signals. The error module may also calculate a total error for the average magnetic field. The total error for the average magnetic field may be expressed as a function of the number of sensors used to detect the magnetic field. For example, the total error for the average magnetic field of the plurality of sensors 188 may be expressed by the following equation:

$$E_{TS} = \Sigma_1^n a_{nS} \sin(nS\theta) \quad \text{(Equation 2)}$$

where S is the number of sensors, n is the order of harmonics, and $a_n$ is the amplitude of the harmonic error.

Using the Equation 2, the total error ($e_1$) when a single sensor, such as the first sensor 188-1, is used to detect the magnetic field 170, may expressed as follows:

$$e_1 = a_1 \sin(\theta) + a_2 \sin(2\theta) + a_3 \sin(3\theta) + a_4 \sin(4\theta) + a_5 \sin(5\theta) \quad \text{(Equation 3)}$$

where the first term represents the error due to the first harmonic component, the second term represents the error due to the second harmonic component, the third term represents the error due to the third harmonic component, the fourth term represents the error due to the fourth harmonic component, and the fifth term represents the error due to the fifth harmonic component.

Figure 9:
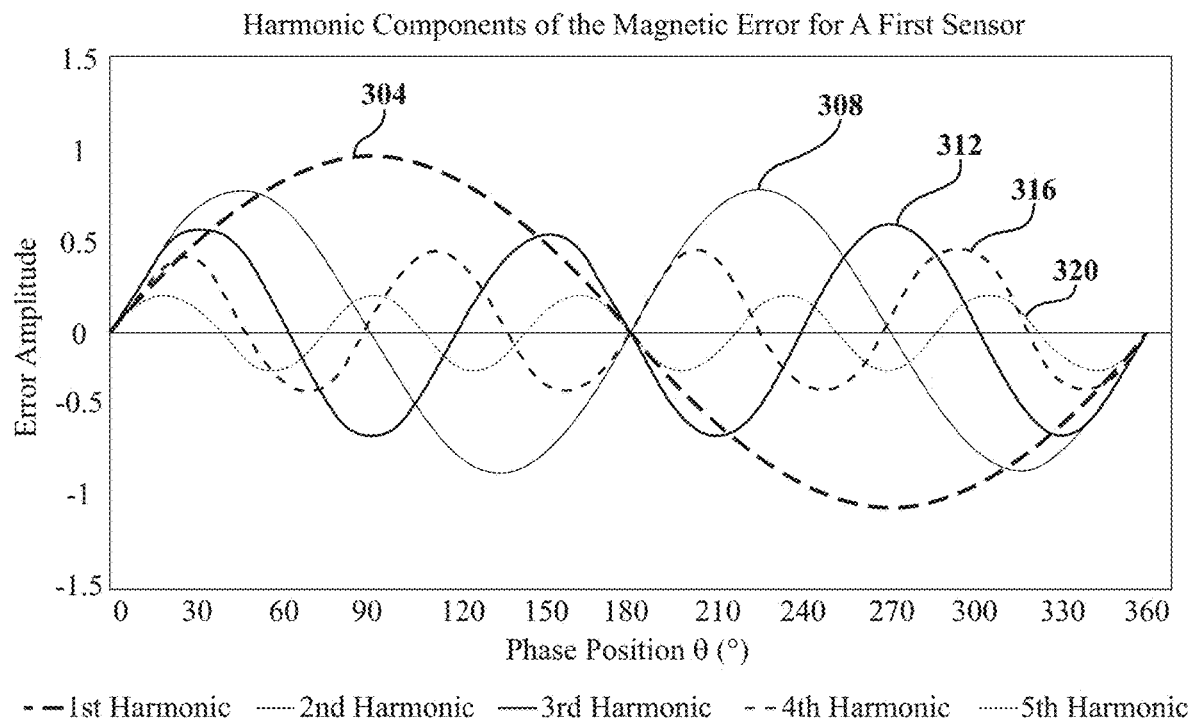
FIG. 9 depicts harmonic components of magnetic error for a first sensor of the magnetoelastic torque sensor assembly according to the teachings of the present disclosure.

FIG. 9 shows the multiple harmonic components of magnetic error for the first signal in terms of the error amplitude (volts) relative to phase angle (θ). The magnetic error for the first signal includes a first harmonic component 304, a second harmonic component 308, a third harmonic component 312, a fourth harmonic component 316, and a fifth harmonic component 320. Each of the plurality of signals may include higher order harmonics than the fifth order, but for the purposes of this disclosure, the effect of each harmonic component after the fifth order may be neglected since with each increase in order of harmonics after the fifth order, the distortion effect may be considered to be minimal.

FIG. 10 shows the magnetic error expressed in terms of error amplitude (volts) relative to phase angle (θ) for different configurations of the plurality of sensors 188. A first error signal ($E_{T1}$) 330 is the error that results when only a single sensor, such as the first sensor 188-1, is used to sense the magnetic field 170. A second error signal ($E_{T2}$) 334 is the error that results when the plurality of sensors 188 includes two sensors, such as the first sensor 188-1 and the second sensor 188-2, to sense the magnetic field 170. A third error signal ($E_{T3}$) 338 is the error that results when the plurality of sensors 188 includes three sensors, such as the first sensor 188-1, the second sensor 188-2, and the third sensor 188-3, to sense the magnetic field 170. A fourth error signal ($E_{T4}$) 342 is the error that results when the plurality of sensors 188 includes four sensors, such as the first 188-1, the second sensor 188-2, the third sensor 188-3, and the fourth sensor 188-4, to sense the magnetic field 170.

The sensor averaging module determines the average magnetic field based on the plurality of signals. The sensor averaging module may include one or more circuits (e.g., a passive average circuit, a noninverting summing circuit, an inverting summing circuit, a voltage divider, etc.) and/or software code or instructions for outputting the average of the plurality of signals. The average of the plurality of signals is indicative of the magnetic field 170 with the multiple harmonic components of the plurality of signals removed.

For example, when the plurality of sensors 188 includes four sensors, the magnetic error (i.e., the fourth error signal ($E_{T4}$) 342) of the average magnetic field signal includes only the fourth harmonic component 316. Using Equation 2, the fourth error signal ($E_{T4}$) 342 may be expressed by the following equation:

$$e_{T4} = \sum_1^n a_{n4} \sin(n4\theta) \quad \text{(Equation 4)}$$

$$e_1 = a_1\sin(\theta) + a_2\sin(2\theta) + a_3\sin(3\theta) + a_4\sin(4\theta) + a_5\sin(5\theta)$$

$$e_2 = a_1\sin(\theta + \pi) + a_2\sin(2\theta + 2\pi) +$$
$$a_3\sin(3\theta + 3\pi) + a_4\sin(4\theta + 4\pi) + a_5\sin(5\theta + 5\pi)$$

$$e_3 = a_1\sin\left(\theta + \frac{2\pi}{3}\right) + a_2\sin\left(2\theta + 2\frac{2\pi}{3}\right) +$$
$$a_3\sin\left(3\theta + 3\frac{2\pi}{3}\right) + a_4\sin\left(4\theta + 4\frac{2\pi}{3}\right) + a_5\sin\left(5\theta + 5\frac{2\pi}{3}\right)$$

$$e_4 = a_1\sin\left(\theta + \frac{4\pi}{3}\right) + a_2\sin\left(2\theta + 2\frac{4\pi}{3}\right) +$$
$$a_3\sin\left(3\theta + 3\frac{4\pi}{3}\right) + a_4\sin\left(4\theta + 4\frac{4\pi}{3}\right) + a_5\sin\left(5\theta + 5\frac{4\pi}{3}\right)$$

where $e_1$, $e_2$, $e_3$, and $e_4$ represent the total error in the first signal generated by the first sensor 188-1 positioned at 0° (i.e., θ), the second signal generated by the second sensor 188-2 positioned at 90° (i.e., θ+π/2), the third signal generated by the third sensor 188-3 positioned at 180° (i.e., θ+π), and the fourth signal generated by the fourth sensor 188-4 positioned at 270° (i.e., θ+3π/2). After simplifying using trigonometric equivalencies, the total error ($E_T$) of the average magnetic field signal simples to:

$$\frac{E_{T4}}{4} = a_4\sin(4\theta) \quad \text{(Equation 5)}$$

The sensor averaging module may also include a comparison module, an analog-to-digital converter (AC/DC), and a fast fourier transform (FFT) module. In some implementations, the FFT module may perform a FFT of one or more signals in order to identify the various harmonic components of the one or more signals. For example, the FFT module may perform an FFT of the first signal, the second signal, the third signal, the fourth signal, and/or the average magnetic field signal.

The comparison module may compare one or more characteristics of the FFT of the average magnetic field with the FFT of the first signal, the FFT of the second signal, the FFT of the third signal, the FFT of the fourth signal and/or another calculated parameter such as the calculated total error in order to verify that at least one of the harmonic components have been removed. A fault signal may be generated when the FFT of the average magnetic field includes one or more unwanted harmonic components. For example, when the plurality of sensors 188 includes the four sensor configuration, the presence of the second or third harmonic components may indicate a fault has occurred.

In some implementations, the AC/DC converter may convert the first signal, the second signal, the third signal, and the fourth signal from analog to digital signals prior to determining the average magnetic field. The AC/DC converter may sample the plurality of signals in accordance with the Nyquist Theorem in order to reduce aliasing. For example, the sampling rate may be set equal to at least twice the highest frequency component of the plurality of signals. In some implementations, the one or more circuits used to output the average of the plurality of signals may be bypassed and the sensor averaging module may be configured to calculate an average of the first, second, third, and fourth digital signals in any suitable manner.

The torque determination module may determine the amount of applied torque 104 based on the average magnetic field. The torque determination module may determine the amount of applied torque in any suitable manner. For example, the torque determination module may determine the applied torque 104 using one or more lookup tables that relates the average magnetic field to the amount of the applied torque 104.

Figure 11:
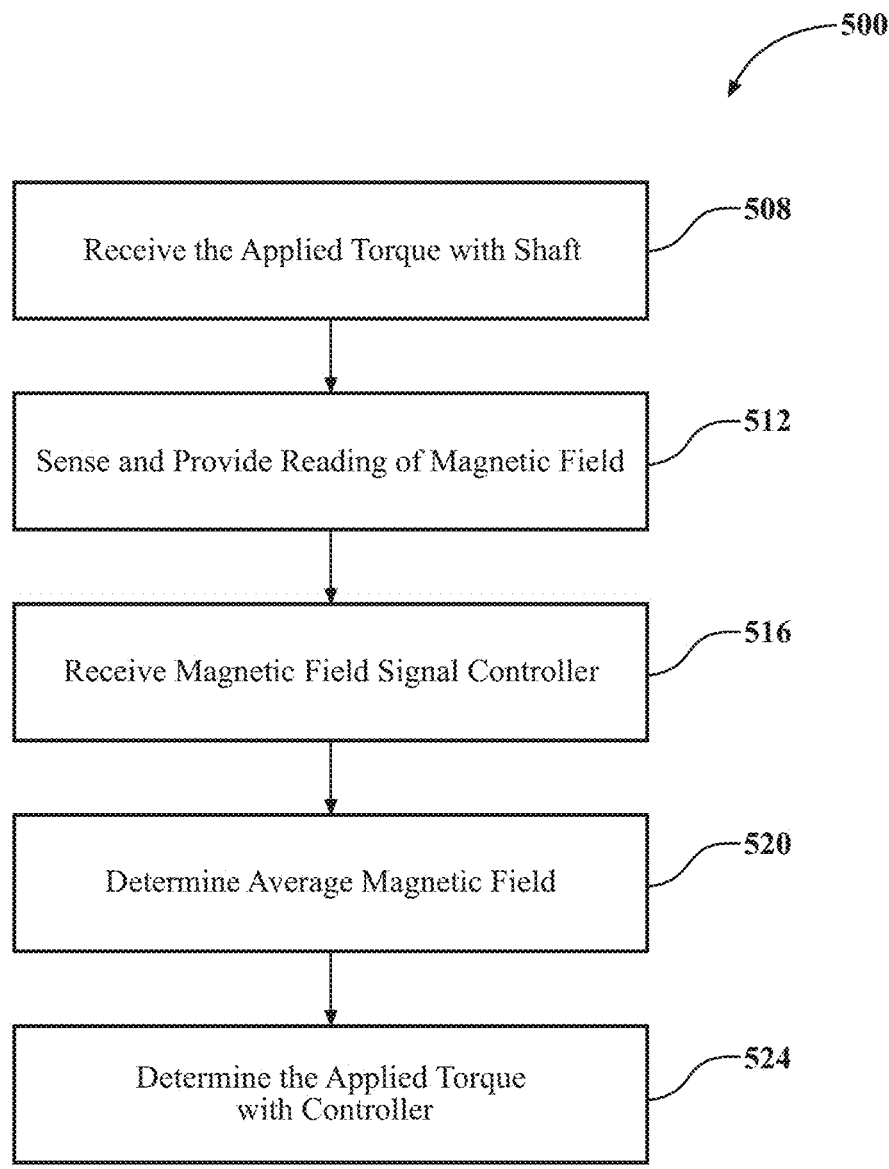
FIG. 11 is a method of determining applied torque with the magnetoelastic torque sensor assembly according to the teachings of the present disclosure.

FIG. 11 demonstrates a method 500 of determining the magnitude of the applied torque 104. The method 500 begins at step 508 where the applied torque 104 is received by the shaft 12. At step 512, the plurality of sensors 188 senses the magnetic field 170 and the ambient magnetic field. At step 516, the plurality of signals indicative of the magnetic field are received by the controller. At step 520, the controller determines the average magnetic field based on the plurality of signals. At 524, the controller determines the magnitude of the applied torque 104 based on the average magnetic field, and the method ends. While the method 500 is described as ending after 524, the method 500 may be a continuous control loop that is performed repeatedly.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The module may include one or more interface circuits. In some examples, the interface circuit(s) may implement wired or wireless interfaces that connect to a local area network (LAN) or a wireless personal area network (WPAN).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from any suitable programming language.

What is claimed is:

1. A torque sensor assembly comprising:
   a shaft configured to receive an applied torque, the shaft including at least one region being magnetoelastic and configured to generate a magnetic field in response to the applied torque;
   a plurality of sensors, circumferentially positioned around the at least one region, being configured to generate a plurality of signals that are indicative of the magnetic field, each signal of the plurality of signals including multiple harmonic components; and
   a controller connected with the plurality of sensors and being configured to:
      receive the plurality of signals;
      determine (i) an average of the plurality of signals in order to cancel at least one of the harmonic components of the multiple harmonic components for each signal of the plurality of signals, and (ii) a magnitude of the applied torque based on the average of the plurality of signals; and
      calculate an error for the average of the plurality of signals, the error for the average of the plurality of signals being expressed as a function of a total number of sensors of the plurality of sensors.

2. The torque sensor assembly of claim 1, wherein sensors of the plurality of sensors are spaced equidistant from each other and the spacing is defined by a predetermined formula.

3. The torque sensor assembly of claim 2, wherein the predetermined formula is 360 degrees divided by a total number of sensors of the plurality of sensors.

4. The torque sensor assembly of claim 1, wherein:
   the plurality of sensors includes a first sensor, a second sensor, a third sensor, and a fourth sensor; and
   the first, second, third, and fourth sensors are spaced at equidistant intervals around the shaft.

5. The torque sensor assembly of claim 1, wherein:
   the controller includes an analog-to-digital converter; and
   prior to determining the average of the plurality of signals, the analog-to-digital converter converts the plurality of signals from analog signals to digital signals.

6. The torque sensor assembly of claim 1, wherein the shaft includes at least one region being non-magnetoelastic.

7. The torque sensor assembly of claim 1, wherein the controller further comprises a circuit that determines the average of the plurality of signals.

8. The torque sensor assembly of claim 1, wherein the at least one region is more than two regions.

9. The torque sensor assembly of claim 8, wherein sensors of the plurality of sensors are circumferentially positioned around the more than two regions.

10. A method of operating a torque sensor assembly, the torque sensor assembly comprising a shaft that is configured to receive an applied torque, the shaft including at least one region being magnetoelastic, a plurality of sensors circumferentially positioned around the at least one region and being spaced equidistant from each other, and a controller connected with the plurality of sensors, the method comprising:
   sensing a magnetic field in response to the applied torque;
   generating a plurality of signals that are indicative of the magnetic field, each signal of the plurality of signals including multiple harmonic components;
   receiving the plurality of signals;
   determining an average of the plurality of signals in order to cancel at least one of the harmonic components of the multiple harmonic components for each signal of the plurality of signals;
   determining a magnitude of the applied torque based on the average of the plurality of signals; and
   calculating an error for the average of the plurality of signals, the error for the average of the plurality of signals being expressed as a function of a total number of sensors of the plurality of sensors.

11. The method of claim 10, further comprising, prior to determining the average of the plurality of signals, converting, with an analog-to-digital converter, the plurality of signals from analog signals to digital signals.

12. A vehicle electronic power steering system comprising:
   a vehicular component configured to provide an applied torque; and
   a torque sensor assembly configured to be coupled with the vehicular component, the torque sensor assembly comprising:
      a shaft configured to receive an applied torque, the shaft including at least one region being magnetoelastic and configured to generate a magnetic field in response to the applied torque;
      a plurality of sensors circumferentially positioned around the at least one region and being configured to generate a plurality of signals that are indicative of the magnetic field, each of the plurality of signals including multiple harmonic components; and
      a controller connected with the plurality of sensors and being configured to:
         receive the plurality of signals;
         determine (i) an average of the plurality of signals in order to cancel at least one of the harmonic components of the multiple harmonic components for each signal of the plurality of signals, and (ii) a magnitude of the applied torque based on the average of the plurality of signals; and
         calculate an error for the average of the plurality of signals, the error for the average of the plurality of signals being expressed as a function of a total number of sensors of the plurality of sensors.

13. The vehicle electronic power steering system of claim 12, wherein sensors of the plurality of sensors are spaced equidistant from each other and the spacing is defined by a predetermined formula.

14. The vehicle electronic power steering system of claim 13, wherein the predetermined formula is 360 degrees divided by a total number of sensors of the plurality of sensors.

15. The vehicle electronic power steering system of claim 12, wherein the controller further comprises a circuit that determines the average of the plurality of signals.

16. The vehicle electronic power steering system claim 12, wherein the at least one region is more than two regions.

17. The vehicle electronic power steering system claim 12, wherein the shaft includes at least one region being non-magnetoelastic.

\* \* \* \* \*